United States Patent Office 3,231,388
Patented Jan. 25, 1966

3,231,388
**CEREAL PRODUCTS FORTIFIED WITH
L-LYSINE $H_3PO_4$**
Halbert C. White, Midland, Mich., assignor to The Dow
Chemical Company, Midland, Mich., a corporation of
Delaware
No Drawing. Filed Dec. 3, 1962, Ser. No. 242,870
3 Claims. (Cl. 99—92)

This application is a continuation-in-part of U.S. patent application Serial No. 786,030, filed January 12, 1959, now abandoned.

This invention concerns the fortification of lysine-deficient cereals and foodstuffs derived therefrom with a new and novel lysine salt which is completely assimilable by the human organism. More particularly, it concerns cereals and cereal-containing baked goods fortified with a nutritionally significant amount of the new and novel L-lysine salt, L-lysine·$H_3PO_4$.

It is well known that cereals are deficient in the essential amino acid, L-lysine. It is also well known to fortify lysine-deficient foodstuffs with lysine and its conventional salts. In proportions having nutritional significance, i.e., between about 0.1 and 1.0 weight percent, unfortified cereal basis, conventional salts are difficult to handle because of their hygroscopicity, or give rise to an undesirably bitter flavor or decrease loaf volume of baked goods or cause excessive and objectionable browning of baked goods.

It has now been discovered that L-lysine·$H_3PO_4$ overcomes the disadvantages of prior art L-lysine salts in that (1) cereals and foodstuffs derived therefrom fortified with L-lysine·$H_3PO_4$ in the indicated amounts are not objectionably bitter; (2) L-lysine·$H_3PO_4$ is relatively non-hygroscopic and is, therefore, more easily handled than other salts, e.g., L-lysine·HCl; (3) nutritionally significant amounts of L-lysine·$H_3PO_4$ can be added to bread dough without causing an undesirable decrease in baked loaf volume; and (4) the addition of nutritionally significant amounts of L-lysine·$H_3PO_4$ to doughs does not cause an objectionably dark browning on baking.

L-lysine·$H_3PO_4$ is prepared by reacting a mixture of substantially equimolar proportions of L-lysine and $H_3PO_4$, i.e., from about 1 to about 1.1 moles of phosphoric acid per mole of L-lysine, advantageously as concentrated phosphoric acid, in an aqueous reaction medium and precipitating the formed L-lysine·$H_3PO_4$ at room temperature with a water-miscible organic liquid precipitant, i.e., any lower monohydric alcohol or acetone, in amount sufficient to precipitate said salt, preferably with added methanol to provide at least about 50 volume percent of methanol. Any reaction temperature between the freezing point of water and the boiling point of the precipitant is operable. The resulting precipitated L-lysine·$H_3PO_4$ is separated from the reaction medium and is washed with methanol or other precipitant.

At a relative humidity less than 80 percent, L-lysine·$H_3PO_4$ is essentially non-hygroscopic, since it gains only up to 0.2 percent of its anhydrous weight on 120 hours' exposure to air at relative humidities up to 80 percent. In contrast thereto, L-lysine·HCl is essentially non-hygroscopic only at a relative humidity below about 57 percent. As a result of their greater hygroscopicity, L-lysine·HCl and other hygroscopic L-lysine salts are not easily used as a means of supplementation of cereals such as wheat, corn, rice, barley and oats, especially in flour form, and foodstuffs containing them.

In practice, the L-lysine·$H_3PO_4$ is added with mixing at any convenient stage in the preparation of the cereal-containing foodstuff.

The following examples describe completely representative specific embodiments and the best mode contemplated by the inventor of carrying out the invention. They are not to be considered as limitative of the invention other than as claimed.

*Example 1*

Two loaves of sponge dough process white bread were baked from the same dough, except that to one was added L-lysine·HCl and to the other was added L-lysine·$H_3PO_4$, each at a level of 2 grams of lysine salt per pound of bread, equivalent to 0.44 weight percent, bread basis. A visual diminution in loaf volume was evident with the L-lysine·HCl fortified bread, but not with the L-lysine·$H_3PO_4$ fortified bread.

*Example 2*

L-lysine salts, as indicated below, were incorporated at the re-mix stage of preparation of sponge dough process bread to the extent of 0.25 weight percent, with observations as noted below.

| Loaf No. | L-lysine salt | Crust color |
|---|---|---|
| 1 | Control | Normal brown. |
| 2 | L-lysine/$H_3PO_4$ | Do. |
| 3 | (L-lysine)$_2$-tartrate | Considerably darker. |
| 4 | (L-lysine)$_3$-citrate | Do. |
| 5 | L-lysine-sorbate | Do. |
| 6 | L-lysine/HCl | Do. |

Loaf No. 6 was extremely bitter in taste. Loaf No. 2 had no objectionable bitterness compared with the control. Loaf No. 2 was most acceptable from the standpoint of crust color. Loaves 3, 4 and 5 would not be acceptable because of excessive crust coloration.

Similar advantageous results are obtained when 0.1 to 1 weight percent of L-lysine·$H_3PO_4$ is added to wheat cereal, oatmeal and barley, or to flours and mixes containing cereal products, whether for use in cooking or baking.

What is claimed is:

1. A cereal-containing foodstuff suitable for use in preparing baked products normally deficient in lysine, said foodstuff being fortified with between about 0.1 and about 1.0 weight percent of L-lysine·$H_3PO_4$, cereal basis.

2. A baked cereal-containing foodstuff normally deficient in lysine fortified with between 0.1 and 1.0 weight percent L-lysine·$H_3PO_4$, cereal basis.

3. Baked goods containing a ceral flour normally deficient in lysine fortified with about 0.1 to about 1.0 weight percent L-lysine·$H_3PO_4$, flour basis.

References Cited by the Examiner
UNITED STATES PATENTS

| | | | |
|---|---|---|---|
| 2,434,087 | 1/1948 | Weber | 99—90 |
| 2,586,154 | 2/1952 | Emmick | 260—534 |
| 2,989,399 | 6/1961 | Ehle | 99—90 |
| 3,015,567 | 1/1962 | Hause et al. | 99—14 |
| 3,053,666 | 9/1962 | Henika et al. | 99—90 |

A. LOUIS MONACELL, *Primary Examiner.*